United States Patent
Odman et al.

(10) Patent No.: US 9,475,643 B1
(45) Date of Patent: Oct. 25, 2016

(54) ROLLER SYSTEM FOR SORTING PRODUCE

(71) Applicants: Todd D. Odman, Yakima, WA (US);
Delbert D. Odman, Yakima, WA (US)

(72) Inventors: Todd D. Odman, Yakima, WA (US);
Delbert D. Odman, Yakima, WA (US)

(73) Assignee: DJT INVESTMENTS, LLC., Yakima, WA (US)

( * ) Notice: Subject to any disclaimer, the term of this patent is extended or adjusted under 35 U.S.C. 154(b) by 0 days.

(21) Appl. No.: 14/738,484

(22) Filed: Jun. 12, 2015

(51) Int. Cl.
*B65G 17/24* (2006.01)
*B65G 39/20* (2006.01)
*A23N 15/00* (2006.01)

(52) U.S. Cl.
CPC .............. *B65G 17/24* (2013.01); *A23N 15/00* (2013.01); *B65G 39/20* (2013.01); *A23N 2015/008* (2013.01)

(58) Field of Classification Search
CPC ...... B65G 17/24; B65G 39/20; A23N 15/00; A23N 2015/008
USPC .................................................. 198/779, 373
See application file for complete search history.

(56) References Cited

U.S. PATENT DOCUMENTS

| | | | | |
|---|---|---|---|---|
| 3,741,371 A | * | 6/1973 | Oldershaw | A23N 15/00 198/360 |
| 4,482,061 A | * | 11/1984 | Leverett | B07C 5/18 198/384 |
| 4,726,898 A | * | 2/1988 | Mills | B07C 5/02 209/545 |
| 487,256 A | | 10/1989 | Van Der Schoot | |
| 5,040,667 A | * | 8/1991 | Kamita | B65G 17/24 198/779 |
| 6,148,989 A | * | 11/2000 | Ecker | A23N 15/00 118/24 |
| 7,228,958 B2 | * | 6/2007 | Hendrik De Greef | A23N 15/00 198/385 |
| 2014/0116853 A1 | * | 5/2014 | Chinnock | B65G 17/24 198/779 |
| 2014/0332345 A1 | * | 11/2014 | Fourney | B65G 13/06 198/459.1 |
| 2015/0283585 A1 | * | 10/2015 | Gual Pasalodos | B07C 5/34 356/237.2 |

FOREIGN PATENT DOCUMENTS

| | | |
|---|---|---|
| IT | EP2676904 A1 | 12/2013 |
| NL | GB1504997 A | 3/1978 |
| NL | 1025386 C2 | 8/2005 |
| WO | WO2008136677 A1 | 11/2008 |
| WO | WO2012038576 A1 | 3/2012 |

* cited by examiner

*Primary Examiner* — Mark A Deuble
(74) *Attorney, Agent, or Firm* — Svendsen Legal, LLC.

(57) ABSTRACT

A roller system for sorting a produce or fruit, with a conveyor having an upper run and a lower run, a roller truck with two spindles and a roller wheel between. The roller truck is attached to side-by-side conveyors each with a string of the roller trucks operating in parallel and a roller drive belt contacting the roller wheel of the roller truck on the upper run, to spin the roller wheel and the roller pair. The side-by-side roller pairs of spindles have a spindle gap between each pair and a pocket is formed between each of roller pairs for receiving the produce, such as cherries, nuts or blueberries. As the roller drive belt rotates the roller wheel, the produce is rolled and repositioned in the pocket, exposing and presenting all surfaces of the produce to an optical scanner.

20 Claims, 9 Drawing Sheets

ROLLER SYSTEM FOR SORTING PRODUCE

TECHNICAL FIELD

The invention relates to devices and methods for positioning objects on a conveyor for sorting, and more specifically a roller system for use in the sorting a produce. The roller system includes pairs of rollers received onto a conveyor chain, to position and rotate the produce, especially smaller and stemmed produce, such as cherries or blueberries. The produce roller system operates to expose all surfaces of the produce, which is especially desirable for use with optical scanning and sorting systems.

BACKGROUND OF THE INVENTION

Produce conveyers are used to move produce through automated scanning and sorting systems. Conventionally, produce conveyors in the form of belts, chains or rollers, are driven by gears, pulleys or wheels. These known devices are useful for moving the produce into position to be scanned for color and blemishes, and then sorted. Presently, conveying devices used in optical scanning equipment roll and position the produce during the scanning operations, to rotate the produce and improve the quality of the results obtained in the automated optical scanning systems. Optical scanning conveying devices separate the processed produce into a multiple of parallel lanes, independently scanning each lane. However, these known conveying devices fail to adequately expose all of the produce surfaces in each lane, especially for smaller and stemmed produce, as the produce is presented to an optical scanner. The exposure of the produce surface to the optical scanner can be limited by the stem of the produce, which impedes the unrestricted positioning of the produce on a conveyor or other produce carrier.

A produce rotating device is needed, that better presents and exposes stemmed produce in optical sorting systems. The present invention addresses this need with a roller system for sorting produce. The following is a disclosure of the present invention that will be understood by reference to the following detailed description taken in conjunction with the accompanying drawings.

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and that the embodiments are sometimes illustrated by fragmentary views, graphic symbols, diagrammatic or schematic representations, and phantom lines. Details that are not necessary for an understanding of the present invention by one skilled in the technology of the invention, or render other details difficult to perceive, may have been omitted.

DETAILED DESCRIPTION OF SPECIFIC EMBODIMENTS

The present invention provides a roller system for sorting produce, or more simply referred to herein as a "roller system" 15. The roller system processes a produce 16. The produce may be any fruit, nut or vegetable, able to be mechanically rotated in the process of its inspection and sorting, which may be a visual inspection, or more preferably in an automated optical scanning and sorting system. The roller system is especially useful in the processing of produce having a stem 17. Typically, the stem impedes the full rotation of the produce when moved along a conventional conveyor, and so therefore benefits from the additional rotational action the roller system provides, as described and shown herein.

Figure 1:
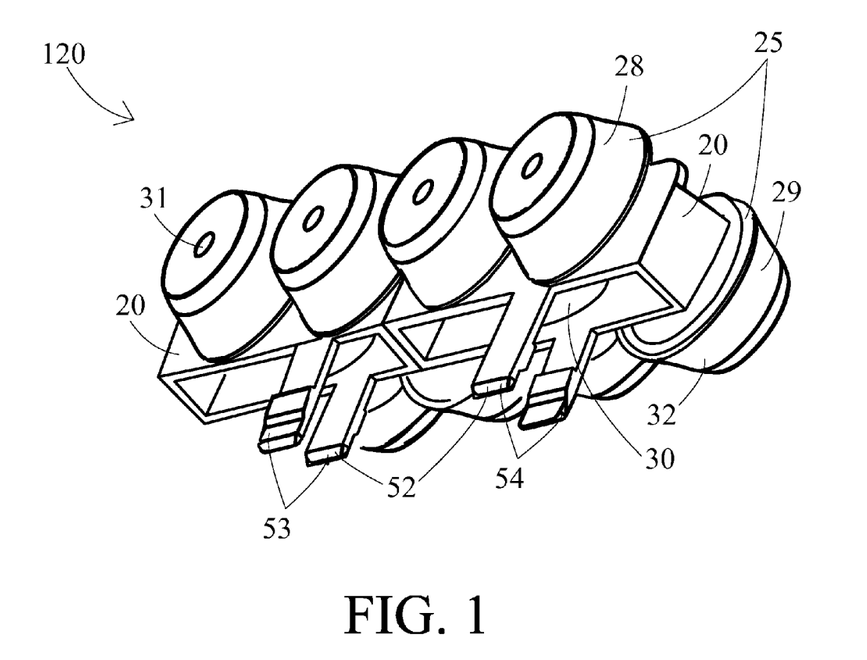
FIG. 1 is a perspective bottom view of a portion of a roller system for sorting produce, according to an embodiment of the invention.
Figure 2:
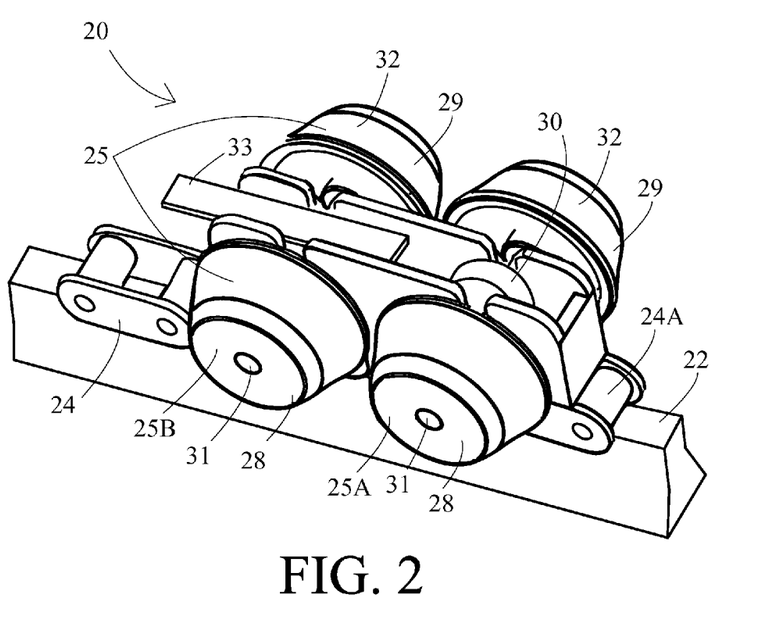
FIG. 2 is a perspective top view of a portion of a roller system for sorting produce, according to an embodiment the invention.
Figure 3:
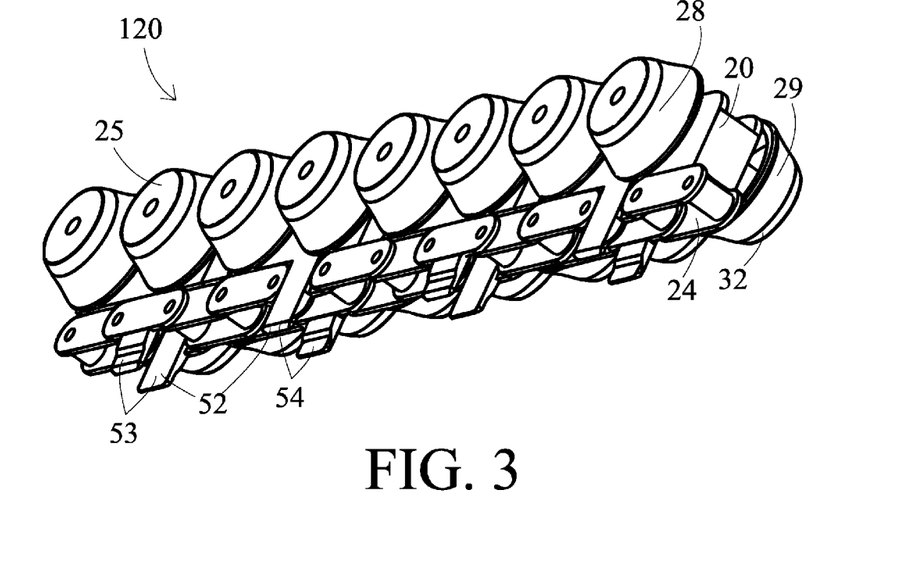
FIG. 3 is a perspective bottom view of a portion of a roller system for sorting produce, according to an embodiment of the invention.

Preferred embodiments of the roller system 15 are shown in FIGS. 1 through 9. The roller system includes a roller truck 20, as shown in FIGS. 1 and 2, attached to a conveyor chain 24 as shown in FIG. 3. Alternatively, the conveyor chain, may be a belt, a loop or any conventional type of conveyor as an alternative. The conveyor chain includes an upper chain run 24A and a lower chain run 24B, which are approximately horizontal runs of the conveyor chain, as it loops around a drive chain gear 26 and a return chain gear 27. Preferably, as also shown in FIG. 2, a chain rail 22 can be used to support the upper chain run of the conveyor chain, to maintain the straight alignment of the conveyer chain and prevent sagging. The chain rail can be fabricated from a metal or as most preferred, a self-lubricating type of milled plastic, such as Nylatron™.

Figure 4:
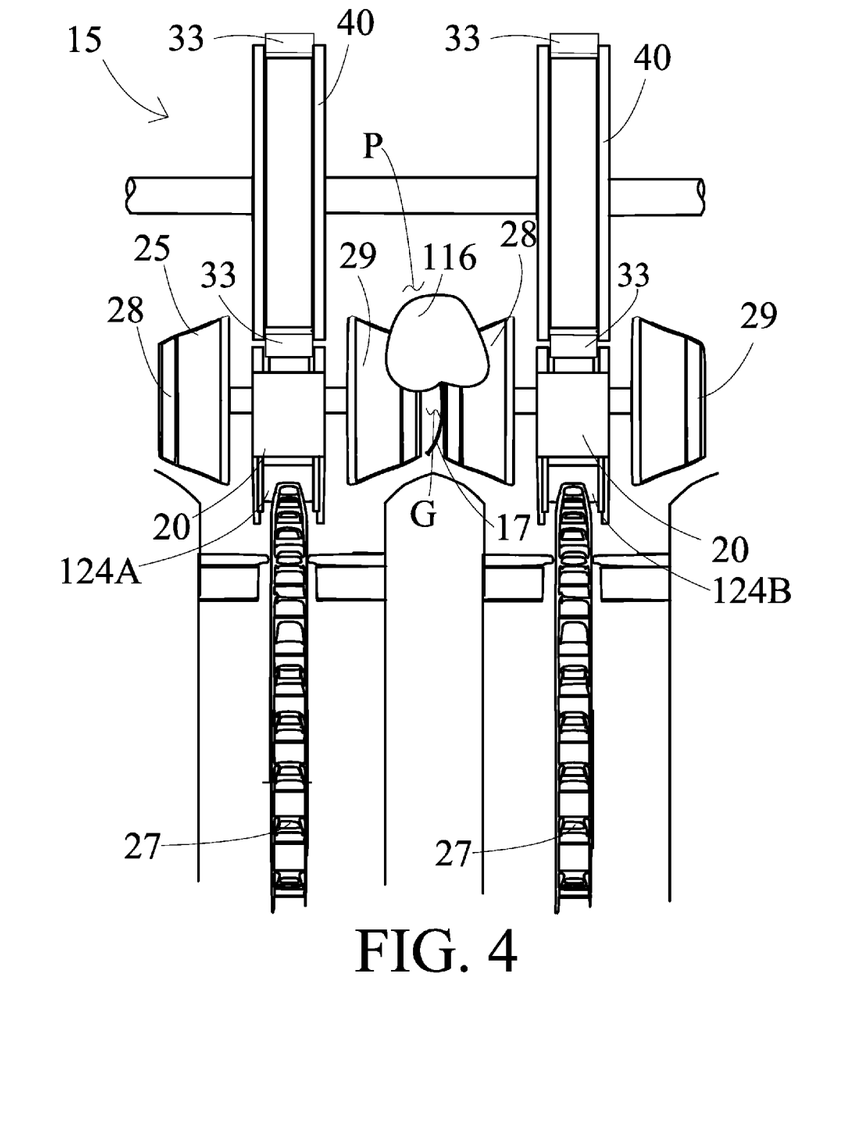
FIG. 4 is a partially sectioned end view of a portion of a roller system for sorting produce, according to an embodiment of the invention.
Figure 9:
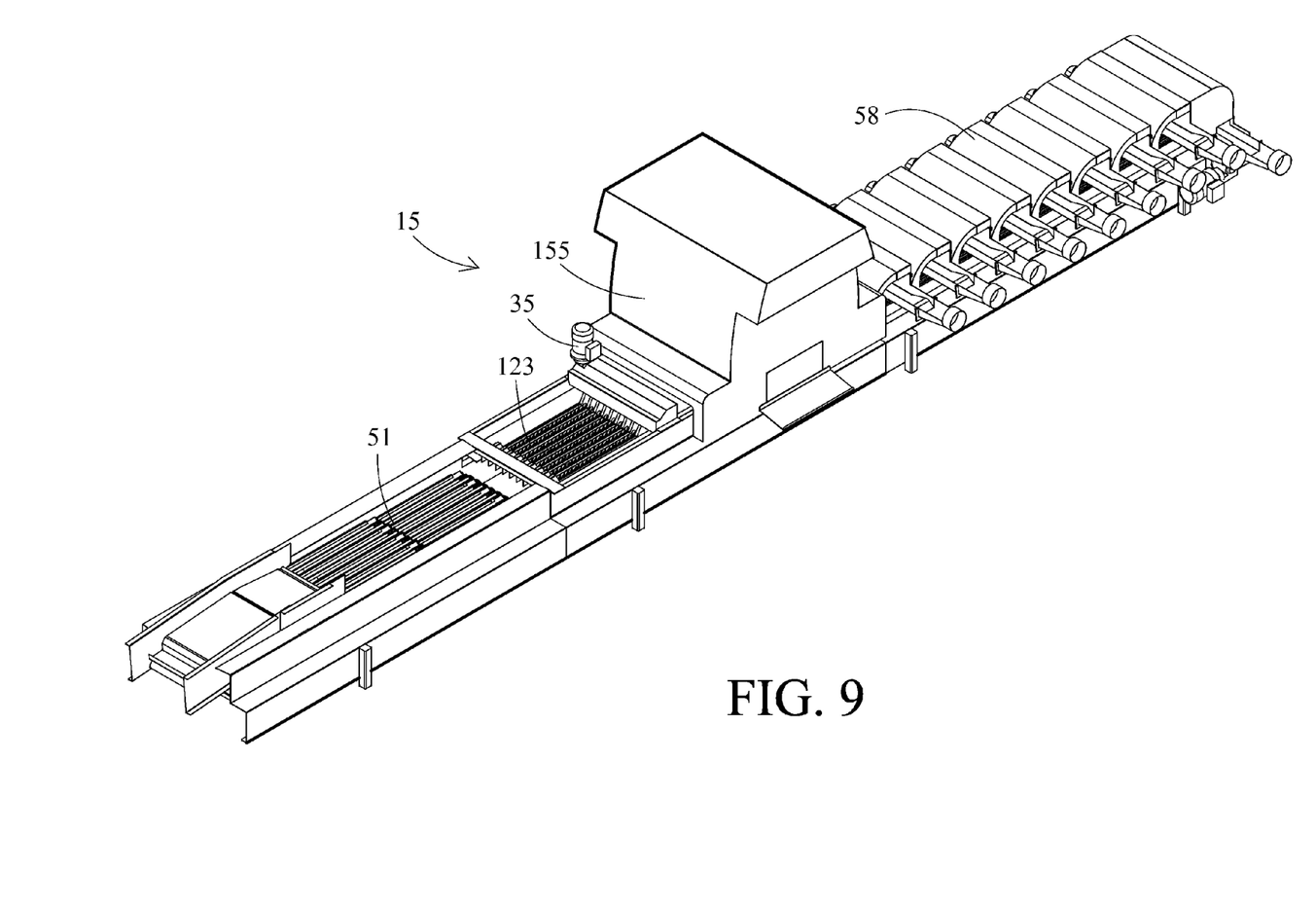
FIG. 9 is a perspective top view of a roller system for sorting produce with an optical scanning system, according to an embodiment of the invention.

The roller system 15 most preferably processes the produce in a processing lane 23 and preferably a multiple of parallel lanes 123, which independently handles the produce 16 received into each lane. For the roller system, a multiple of conveyor chains 124 are positioned in parallel, as shown in FIG. 9, with each conveyor chain receiving a string of roller trucks 120 on each of the multiple of parallel lanes. As shown in FIG. 4, a side-by-side pair of conveyor chains, namely a first paired conveyor chain 124A and a second paired conveyor chain 124B, each with strings of roller trucks operating in parallel, form the processing lane between the roller trucks of the side-by-side pair of conveyor chains.

Figure 5:
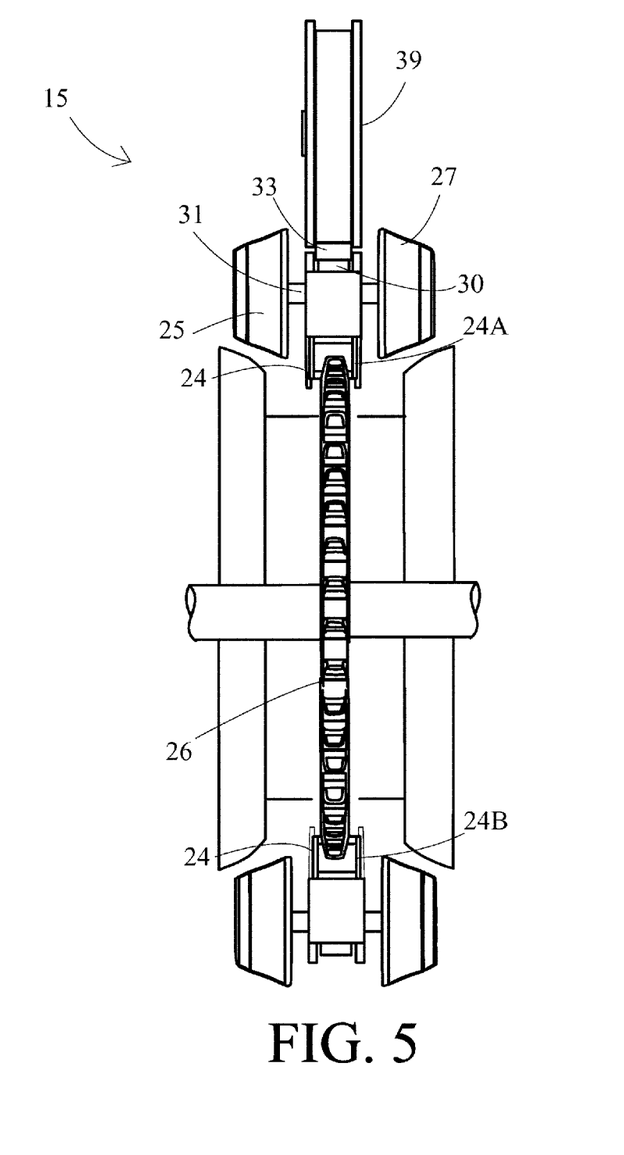
FIG. 5 is a partially sectioned end view of a portion of a roller system for sorting produce, according to an embodiment of the invention.

Each roller truck 20 in the string of roller trucks 120 has minimum of a roller pair 25. Preferably for each roller truck, as shown in FIGS. 1 through 3, a first roller pair 25A is positioned next to a second roller pair 25B. As shown in FIGS. 2, 4 and 5, each roller pair has a first roller spindle 28 connected to a second roller spindle 29, with a roller drive wheel 30 between. The first roller spindle and the second roller spindle of the roller drive pair effectively "sandwich" the roller drive wheel and are coaxial with each other, rotating about a roller axle 31 in common. A roller spindle 32, as generally referring to either the first roller spindle or the second roller spindle, is preferably cup-shaped and fabricated from a plastic, such as ABS, TFE, or other suitable material as known to persons skilled in the technology of rollers and spindles for use with produce 16.

A roller drive belt 33 contacts the roller drive wheel 30 to spin the roller drive wheel, which in-turn spins the roller pair 25 about the roller axle 31. Preferably, the roller drive belt is a flat belt having a square or alternatively a trapezoidal cross-section. The roller drive belt can be made from a flexible, extruded polyurethane material. However, any suitable material or cross sectional shape could be used for the roller drive belt, as known to persons skilled in the technology of drive belts, including linearly grooved or laterally notched belts.

The strings of roller trucks 120 operate in parallel, within the processing lane 23 formed between the side-by-side pair of conveyor chains 124A and 124B. The first roller spindle 28 of the roller truck 20 attached to the first of the side-by-side pair of conveyor chains 124A mirrors the second roller spindle 29 of the roller truck attached to the second of the side-by-side pair of conveyor chains 124B. The first roller spindle attached to each of the roller trucks on first of the side-by-side pair of conveyor chains opposes the second roller spindle of each of the roller trucks attached to the second of the side-by-side pair of conveyor chains to form a lane roller pair 128 with a spindle gap G between each of the paired first roller spindles and the second roller spindles of each lane roller pair, as shown in FIG. 4.

Figure 7:
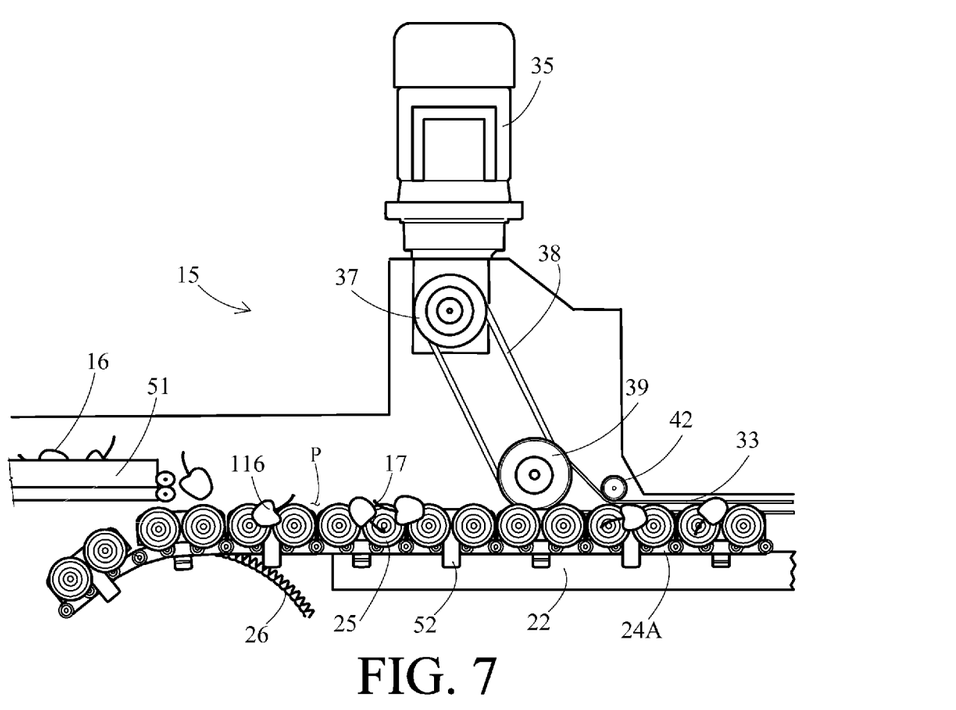
FIG. 7 is a side view of a portion of a roller system for sorting produce, according to an embodiment of the invention.
Figure 8:
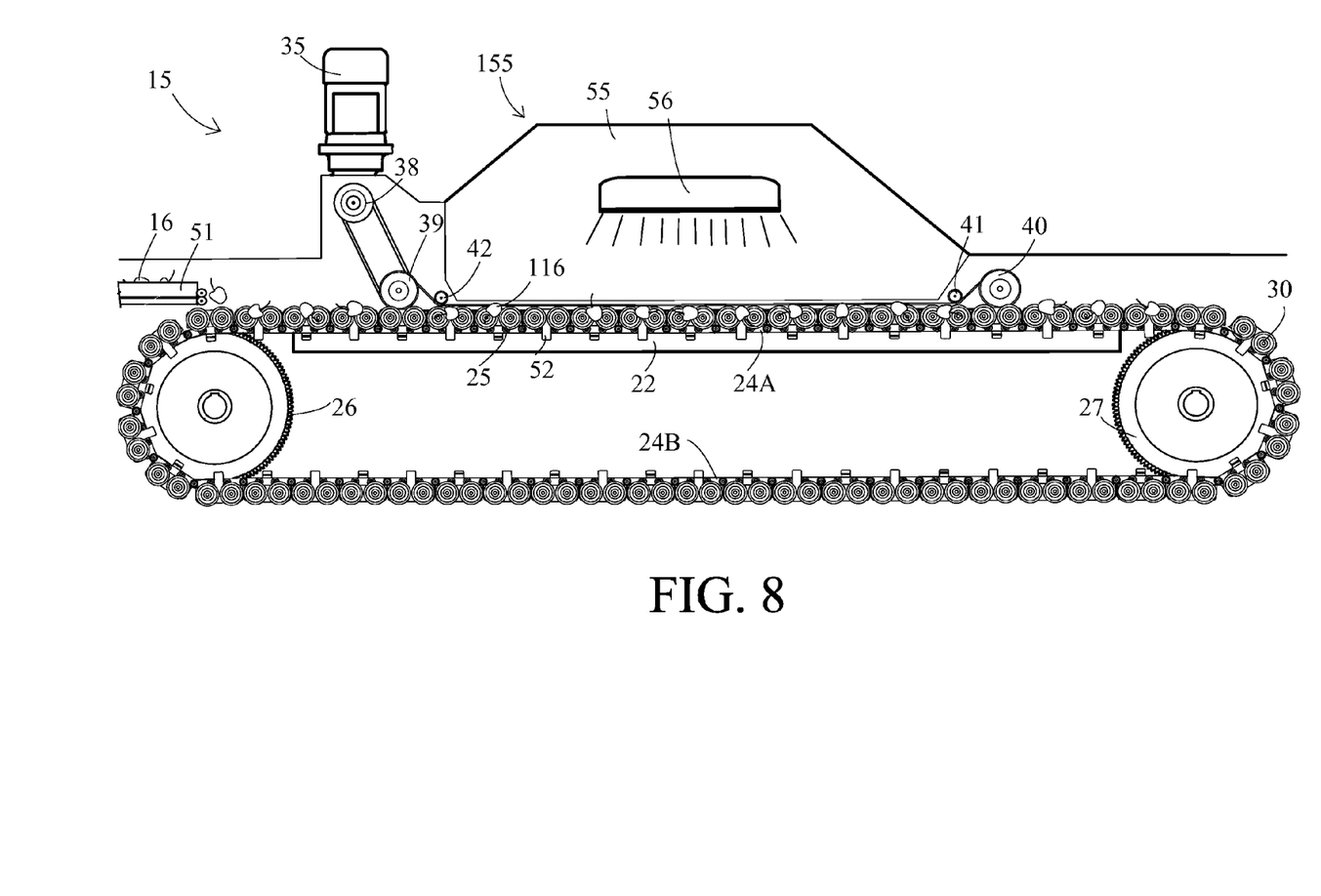
FIG. 8 is a side view of a portion of a roller system for sorting produce with an optical scanning system, according to an embodiment of the invention.

Additionally, a produce pocket P is formed between each of the lane roller pairs 128. The produce pocket receives the produce 16 and as shown in FIGS. 4, 7 and 8. The produce pocket is bounded by the first roller spindle 28 of the first roller pair 25A and the first roller spindle of the second roller pair 25B on the first of the side-by-side pair of conveyor chains 124A, and the second roller spindle 29 of the first roller pair and the second roller spindle of the second roller pair on the second of the side-by-side pair of conveyor chains 124B. The produce pocket can be bounded by the spindles of any adjacent roller pairs in the string of roller trucks 120 in any of the lane roller pairs.

The spinning of the roller pair 25 by the contact of the roller drive belt 33 on the roller drive wheel 30 to spin the roller drive wheel, which results in rotation of the produce within the produce pocket P. Preferably, as shown in FIG. 2, the roller truck 20 has a roller belt slot 34. The roller drive belt moves linearly within the roller belt slot, with the roller drive belt contacting and the roller drive wheel to spin the roller drive wheel. Spinning the roller drive wheel rotates the roller axle 31, thereby rotating the attached first roller spindle 28 and the second roller spindle 29.

Most preferably, the first roller spindle 28, the second roller spindle 29 and the roller drive wheel 30 are locked to the roller axle 31 to prevent independent rotation. The rotation of the roller axle by the roller drive wheel requires the same rotation of the first roller spindle and the second roller spindle. Slippage between the roller drive belt and the roller drive wheel prevents stripping of the roller axle from the roller drive wheel, and also minimizes the potential of pinching between any neighboring roller pair 25.

The roller drive belt 33 is an endless belt, and preferably driven indirectly by a belt drive motor 35, as shown in FIG. 7. The drive belt motor cranks a motor drive wheel 37, which is connected by a transfer belt 38 to a roller belt drive pulley 39. The transfer belt is preferably a standard, industrial belt having a v-shaped cross section. However, any suitable material or cross-sectional shape could be used for the transfer belt, as known to persons skilled in the technology of drive belts, including linearly grooved or laterally notched belts. The belt drive motor is preferably positioned above the conveyor chain 24 and most preferably an electric motor sized to turn a multiple of motor drive wheels. Each motor drive wheel connects in parallel to each roller belt drive pulley by individual transfer belts, and with each roller belt drive pulley in turn moving the roller drive belt on a separate lane of the multiple of parallel lanes 23, as shown in FIG. 9.

As the roller drive belt 33 moves linearly within the roller belt slot 34 of each roller truck 20 along the upper chain run 24A, and the roller drive belt contacting the roller drive wheel 30 to spin the roller drive wheel. Specifically, the roller drive belt moves substantially horizontal and in parallel to the upper chain run and contacts each roller drive wheel attached to the conveyor chain 24 between the primary roller drive pulley 39 and a roller belt return pulley 40, along the upper chain run. The roller belt has a lower belt run 33A that contacts the roller drive wheels of string of roller trucks 120 along the upper chain run between the roller belt drive pulley and the roller belt return pulley, as shown in FIG. 7. After moving about the rotating roller belt return pulley, the roller belt also has an upper belt run 33B that returns to the roller belt drive pulley, as shown in FIG. 8.

Figure 6:
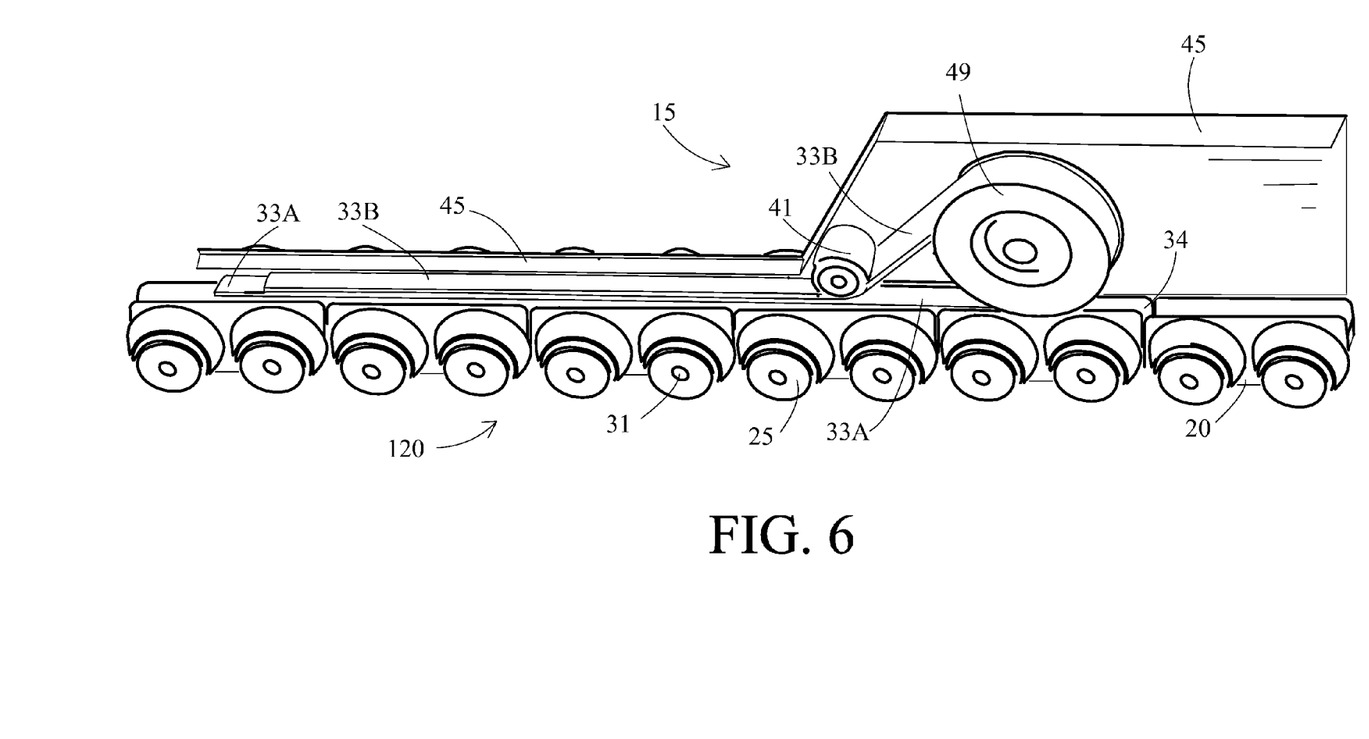
FIG. 6 is a perspective top view of a portion of a roller system for sorting produce, according to an embodiment of the invention.

Preferably, a return end belt tensioning roller 41 is positioned proximate to the roller belt return pulley 40 as shown in FIG. 6, to redirect the returning upper belt run 33B of the roller drive belt 33, as it rotates off of the roller belt return pulley. Similarly, a drive end belt tensioning roller 42 is positioned proximate to the roller belt drive pulley 39, to further redirect the returning upper belt run 33B of the roller drive belt 33, as it moves onto the roller belt drive pulley. The action of the return end belt tensioning roller with the drive end belt tensioning roller serves to narrow the separation between the lower belt run 33A and the upper belt run 33B. This minimized separation maintains a low height between neighboring lanes in the multiple of parallel lanes 23 in the roller system 15, with each lane of the multiple of parallel lanes 123 in the roller system 15 is separated by a roller belt guard 45, as shown in FIG. 6.

Each roller truck 20 attaches to the conveyor chain 24 with a truck clip 52. As shown in FIG. 1, the truck clip may be an inner truck clip pair 53 or an outer truck clip pair 54. Preferably, the roller trucks in the string of roller trucks 120 are not connected to each other, which facilitates the individual roller trucks movement around the drive chain gear 26 and the return chain gear 27, as shown in FIG. 8. Additionally, the roller trucks in the string of roller trucks preferably alternate between roller trucks having the inner truck clip pair and the outer truck clip pair. This allows the roller trucks in the string of roller trucks to better attach to the conveyor chain's individual inward and outward links, as shown in FIG. 3.

As shown in FIGS. 7 and 8, the produce 23 is fed individually, into the multiple of parallel lanes 123, as formed between the strings of roller trucks 120, each moving along the multiple of conveyor chains 124. The produce can be any produce with the ability to be handled by the roller trucks 20 and more particularly processed by the lane roller pairs 128 with first roller spindles 28 and second roller spindles 29 paired together to receive, move and rotate the produce received into the produce pocket P, as shown in FIG. 4.

The produce 16 preferably processed by the roller system 15 is a cherry, and most preferably a sweet cherry variety, which typically includes a stem 17 that prevents easy rotation in conventional sorting and inspecting conveyor systems. Other produce that could be processed by the roller system includes: blueberries, any berries in general, tomatoes, plums, kiwi fruit, kumquats, apples, pears, potatoes, any stone fruits such as peaches plums and apricots, citrus fruits such as tangerines, oranges, and 'pie cherries' or sour cherries. It is also expected that the roller system could be employed to process nuts, and especially smaller sized nuts with stems or irregular shapes, such as pecans, pistachios and almonds.

A single produce item 116, introduced by a feed conveyor 51, which then places the single produce item onto the processing lane 23 will rest within the produce pocket P formed between each of the lane roller pairs 128, as shown in FIGS. 4, 7 and 8. As the string of roller trucks 120 attached to the multiple of conveyor chains 124 continue to advance, each single produce item remains in its produce pocket, but rotates in place due to the rotation of each roller spindle 32 in each roller truck 20, by action of the roller drive belt on the roller drive wheel. The stem 17 of the produce 16 finds its way into the spindle gap G as the produce rotates. This rotational or rolling motion of the produce presents much of the produce to a scanner 55. The scanner is thus able to scan the full surface of the produce, including the bottom, the sides and the stem cavity, as the fruit moves past.

Therefore, a significant advantage of the roller system 15 is the spindle gap G, formed between the lane roller pairs 128. This spindle gap provides a path for the stem 17 to pass through, as the produce 16 rotates within the produce pocket P. The roller system exposes and presents all of the produce's surfaces to the optical scanning system 155. The ability of the produce to fully rotate increases the processing speed effectiveness and thoroughness of an optical scanning system employing the roller system, as shown in FIG. 9. FIGS. 8 and 9 show the preferred location of the scanner 55, in the roller system. The scanner typically includes a light source 56, as shown in FIG. 8. Most preferably, the scanner processes an image of each single produce item 116, and uses a computer-operated interface with an ejection conveyor 58, as shown in FIG. 9, to selectively reject produce that fails to meet an acceptable set of criteria. Alternatively, the roller system could be employed with any other types of scanners and sorting devices known to those persons skilled in produce scanning and inspecting technology.

The separation of the lane roller pairs 128 onto parallel strings of roller trucks 120 mounted on side by side pairs of conveyor chains 124A and 124B makes the spindle gap G possible. Additionally, the addition of the roller drive wheel 30 in each roller truck 20 rotated by the roller drive belt 33 out of the processing lane 23, is another advantage of the roller system 15. The roller drive belt is removed from the processing lane and unable to pinch or grab the produce 16, including the stem 17 of the produce, and is intrinsically safe to users of the roller system.

The multiple of conveyor chains 124 are all linked together to form included in the multiple of parallel lanes 123 for the roller system 15, as shown in FIG. 9. Rotational power is supplied to the drive chain gear 26 causing the conveyor chain 24 for each processing lane to continuously advance. Most Preferably, the multiple of conveyor chains advance in a direction opposite the direction of motion of the roller drive belt 33 along the lower belt run 33A, which is driving the roller drive wheel 30 of each roller truck 20.

In compliance with the statutes, the invention has been described in language more or less specific as to structural features and process steps. While this invention can be embodied in different forms, the specification describes and illustrates preferred embodiments of the invention. It is to be understood that this disclosure is an exemplification of the principles of the invention, and is not intended to limit the invention to the particular embodiments described. Those with ordinary skill in the art will appreciate that other embodiments and variations of the invention, which employ the same inventive concepts as the invention, are possible. Therefore, the invention is not to be limited except by the following claims.

The terms "approximately" or "approximate" are employed herein throughout, including this detailed description and the attached claims, with the understanding that the terms denote a level of exactness as typical for the skill and precision in the generally applicable field of technology, and well known to those persons knowledgeable or skilled in agricultural practices, and especially in the design and engineering of mechanized harvesters 17 and related devices.

In compliance with the statutes, the invention has been described in language more or less specific as to structural features and process steps. While this invention is susceptible to embodiments in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

The following is claimed:

1. A roller system for sorting a produce, the roller system including:
   a conveyor, the conveyor having an upper run and a lower run;
   a roller truck attached to the conveyor, the roller truck having a minimum of a roller pair, the roller pair including a first roller spindle connected to a second roller spindle with a roller drive wheel between, and the first roller spindle, the second roller spindle and the roller drive wheel rotate about a roller axle in common;
   a processing lane formed between a side-by-side pair of conveyors, the side-by-side pair of conveyors including a first paired conveyor and a second paired conveyor, the first paired conveyor having a first string of the roller trucks, and a second paired conveyor having a second string of roller trucks, the first string of the roller trucks and the second string of the roller trucks operating in parallel;
   a roller drive belt contacts the roller drive wheel of the roller truck along the upper run of the conveyor, the roller drive belt spins the roller drive wheel, and which spins the roller pair about the roller axle;
   the first roller spindle attached to the first paired conveyor of the side-by-side pair of conveyors mirrors the second roller spindle attached to the second paired conveyor of the side-by-side pair of conveyor chains, to form a lane roller pair of a paired first roller spindle and second roller spindle of each lane roller pair, the lane roller pair having a spindle gap between each of the paired first roller spindle and second roller spindle of each lane roller pair; and a produce pocket formed between each of the lane roller pairs, the produce pocket for receiving the produce.

2. The roller system of claim 1, wherein:

the pocket formed between each of the lane roller pairs is bounded by the first roller spindle the first roller pair and the first roller spindle of the second roller pair of the roller truck on the first of the side-by-side pair of conveyors and the second roller spindle of first roller pair and the second roller spindle of second roller pair of the roller truck on the second of the side-by-side pair of conveyors; and the pocket receives the produce.

3. The roller system of claim 1, wherein:

the produce includes a stem and the stem travels through the spindle gap between each of the paired first roller spindle and second roller spindle of each lane roller pair, as the produce rotates by the spinning action of the paired first roller spindle and second roller spindle of each lane roller pair.

4. The roller system of claim 1, wherein:

the spinning of the roller pair by the contact of the roller drive belt on the roller drive wheel spins the roller drive wheel, and the spinning of the roller drive wheel rotates the roller axle to rotate the attached first roller spindle and the second roller spindle, which results in rotation of the produce within the produce pocket.

5. The roller system of claim 1, wherein the produce is selected from the group consisting of:

a blueberry, a berry, a cherry, a tomato, a stone fruit, a kiwi fruit, a citrus fruit, a potato, an apple, a kumquat, and a nut.

6. The roller system of claim 3, wherein:

a single produce item fed onto the processing lane rests within the produce pocket formed between each of the lane roller pairs, and as the string of roller trucks attached to the multiple of conveyors advances, each single produce item remains in its produce pocket but rotates in place due to the rotation of each roller spindle in each roller truck, by action of the roller drive belt on the roller drive wheel;

the stem of the produce finds its way into the spindle gap as single produce item rotates This rotational motion of the single produce item presents much of the single produce item to a scanner.

7. The roller system of claim 1, wherein:

the roller drive belt moves substantially horizontally and in parallel to the upper chain run and contacts each roller drive wheel attached to the conveyor between the primary roller pulley and a roller belt return pulley, along the upper run;

the roller belt has a lower belt run that contacts the roller drive wheels of string of roller trucks along the upper run between the roller belt drive pulley and the roller belt return;

after moving about the rotating roller belt return pulley, the roller belt includes an upper belt run that returns to the roller belt drive pulley.

8. The roller system of claim 1, wherein:

a return end belt tensioning roller positioned proximate to the roller belt return pulley, to redirect the returning upper belt run of the roller drive belt as it rotates off of the roller belt return pulley; and a drive end belt tensioning roller positioned proximate to the roller belt drive pulley, to redirect the returning upper belt run of the roller drive belt, as a it moves onto the roller belt drive pulley.

9. The roller system of claim 1, wherein the conveyor is a chain and each roller truck attaches to the conveyor with a truck clip.

10. The roller system of claim 1, wherein:

the roller truck has a roller belt slot, and the roller drive belt moves linearly within the roller belt slot, with the roller drive belt contacting and the roller drive wheel to spin the roller drive wheel.

11. A roller system for sorting a produce, the roller system including:

a conveyor chain, the conveyor chain having an upper run and a lower run;

a roller truck attached to the conveyor chain, the roller truck having a minimum of a roller pair, the roller pair including a first roller spindle connected to a second roller spindle with a roller drive wheel between, and the first roller spindle, the second roller spindle and the roller drive wheel rotate about a roller axle in common;

a side-by-side pair of conveyor chains including a first paired conveyor chain and a second paired conveyor chain, the first paired conveyor chain having a first string of the roller trucks, and a second paired conveyor having a second string of roller trucks, the first string of roller trucks and the second string of roller trucks operating in parallel with a processing lane between the roller trucks of the side-by-side pair of conveyor chains;

a roller drive belt contacting the roller drive wheel of the roller truck along the upper run of the conveyor chain, and the roller drive belt spins the roller drive wheel, which spins the roller pair about the roller axle;

the first roller spindle attached to the first paired conveyor chain of the side-by-side pair of conveyors and the second roller spindle attached to the second paired conveyor chain of the side-by-side pair of conveyor chains, includes a lane roller pair of a paired first roller spindle and second roller spindle of each lane roller pair, the lane roller pair having a spindle gap between each of the paired first roller spindle and second roller spindle of each lane roller pair; and a produce pocket bounded by the lane roller pairs, the produce pocket for receiving the produce.

12. The roller system of claim 11, wherein:

the pocket formed between each of the lane roller pairs is bounded by the first roller spindle the first roller pair and the first roller spindle of the second roller pair of the roller truck on the first of the side-by-side pair of conveyor chains and the second roller spindle of first roller pair and the second roller spindle of second roller pair of the roller truck on the second of the side-by-side pair of conveyor chains; and the pocket receives the produce.

13. The roller system of claim 11, wherein:

the produce includes a stem and the stem travels through the spindle gap between each of the paired first roller spindle and second roller spindle of each lane roller pair, as the produce rotates by the spinning action of the paired first roller spindle and second roller spindle of each lane roller pair.

14. The roller system of claim 11, wherein:
the spinning of the roller pair by the contact of the roller drive belt on the roller drive wheel spins the roller drive wheel, and the spinning of the roller drive wheel rotates the roller axle to rotate the attached first roller spindle and the second roller spindle, which results in rotation of the produce within the produce pocket.

15. The roller system of claim 11, wherein the produce is selected from the group consisting of:
a blueberry, a berry, a cherry, a tomato, a stone fruit, a kiwi fruit, a citrus fruit, a potato, an apple, a kumquat, and a nut.

16. The roller system of claim 13, wherein:
a single produce item fed onto the processing lane rests within the produce pocket formed between each of the lane roller pairs, and as the string of roller trucks attached to the multiple of conveyor chains advances, each single produce item remains in its produce pocket but rotates in place due to the rotation of each roller spindle in each roller truck, by action of the roller drive belt on the roller drive wheel;
the stem of the produce finds its way into the spindle gap as single produce item rotates This rotational motion of the single produce item presents much of the single produce item to a scanner.

17. The roller system of claim 11, wherein:
the roller drive belt moves substantially horizontally and in parallel to the upper chain run and contacts each roller drive wheel attached to the conveyor chain between the primary roller pulley and a roller belt return pulley, along the upper chain run;
the roller belt has a lower belt run that contacts the roller drive wheels of string of roller trucks along the upper chain run between the roller belt drive pulley and the roller belt return;
after moving about the rotating roller belt return pulley, the roller belt includes an upper belt run that returns to the roller belt drive pulley.

18. The roller system of claim 11, wherein:
a return end belt tensioning roller positioned proximate to the roller belt return pulley, to redirect the returning upper belt run of the roller drive belt as it rotates off of the roller belt return pulley; and
a drive end belt tensioning roller positioned proximate to the roller belt drive pulley, to redirect the returning upper belt run of the roller drive belt, as a it moves onto the roller belt drive pulley.

19. The roller system of claim 11, wherein the conveyor is a chain and each roller truck attaches to the conveyor with a truck clip.

20. The roller system of claim 11, wherein:
the roller truck has a roller belt slot, and the roller drive belt moves linearly within the roller belt slot, with the roller drive belt contacting and the roller drive wheel to spin the roller drive wheel.

* * * * *